US006884029B2

(12) United States Patent
Beeck

(10) Patent No.: US 6,884,029 B2
(45) Date of Patent: Apr. 26, 2005

(54) HEAT-TOLERATED VORTEX-DISRUPTING FLUID GUIDE COMPONENT

(75) Inventor: Alexander Ralph Beeck, Orlando, FL (US)

(73) Assignee: Siemens Westinghouse Power Corporation, Orlando, FL (US)

(*) Notice: Subject to any disclaimer, the term of this patent is extended or adjusted under 35 U.S.C. 154(b) by 162 days.

(21) Appl. No.: 10/255,893

(22) Filed: Sep. 26, 2002

(65) Prior Publication Data
US 2004/0179943 A1 Sep. 16, 2004

(51) Int. Cl.[7] .................................................. F03D 5/08
(52) U.S. Cl. ..................... 415/191; 415/914; 416/97 R; 416/193 A; 416/235
(58) Field of Search ........................ 415/191, 115, 415/208.1, 208.2, 210.1, 914; 416/97 R, 97 A, 96 R, 193 A, 228, 235, 236 R, 237

(56) References Cited

U.S. PATENT DOCUMENTS

| | | | |
|---|---|---|---|
| 2,984,454 A | 5/1961 | Fiori | |
| 3,314,648 A | 4/1967 | Howald | |
| 3,971,586 A | 7/1976 | Saunders | |
| 4,208,167 A | 6/1980 | Yasugahira et al. | |
| 4,739,621 A | 4/1988 | Pettengill et al. | |
| 5,609,466 A | 3/1997 | North et al. | |
| 5,772,398 A | 6/1998 | Noiret et al. | |
| 6,099,251 A | * 8/2000 | LaFleur | 416/97 R |
| 6,186,445 B1 | 2/2001 | Batcho | |
| 6,283,713 B1 | 9/2001 | Harvey et al. | |
| 6,419,446 B1 | 7/2002 | Kvasnak et al. | |

FOREIGN PATENT DOCUMENTS

| | | | |
|---|---|---|---|
| EP | 1 197 636 A2 | 4/2002 | |
| GB | 2 233 401 A | 9/1991 | |
| JP | 09324604 A | * 12/1997 | ............. F01D/9/02 |

OTHER PUBLICATIONS

T. I–P. Shih and Y.–L. Lin, Controlling Secondary–Flow Structure by Leading–Edge Airfoil Fillet and Inlet Swirl to Reduce Aerodynamic Loss and Surface Heat Transfer, Jun. 3–6, 2002,1 through 10, GT–2002–30529, ASME.

* cited by examiner

Primary Examiner—Edward K. Look
Assistant Examiner—Dwayne J. White

(57) ABSTRACT

A vortex-reducing fluid guide component is disclosed. The fluid guide component includes a base portion and an upstanding body portion. An internally-cooled blending element extends between the base portion and a leading edge of the body portion. The blending element includes a deflection region that advantageously disrupts horseshoe vortex formation. The fluid guide component includes a supplemental cooling channel between the blending element and the intersection of the body portion leading edge and the base portion. In one embodiment, the supplemental cooling channel captures cooling fluid used to cool the blending member and provides additional cooling to the body portion leading edge/base interface. The component includes a strategically-perforated impingement panel or member that distributes cooling fluid to selected portions of the blending member, thereby ensuring that key regions within the blending member are efficiently cooled in accordance with temperature distribution.

19 Claims, 3 Drawing Sheets

HEAT-TOLERATED VORTEX-DISRUPTING FLUID GUIDE COMPONENT

FIELD OF THE INVENTION

This invention relates generally to the field of turbine engines and, more particularly, to a fluid guide component having heat-tolerant, vortex-disrupting features.

BACKGROUND OF THE INVENTION

Combustion engines are machines that convert chemical energy stored in fuel into mechanical energy useful for generating electricity, producing thrust, or otherwise doing work. These engines typically include several cooperative sections that contribute in some way to this energy conversion process. In industrial gas turbine engines, air discharged from a compressor section and fuel introduced from a fuel supply are mixed together and burned in a combustion section. The products of combustion (also referred to as a "working fluid") are harnessed and directed through a turbine section, where they expand and turn a central rotor shaft. Spinning of the rotor shaft produces torque output, and the rotor shaft output may, in turn, be linked to devices such as an electric generator to produce electricity. As the need for electricity rises, so to do the performance demands made upon industrial gas turbine engines. More and more, these engines are expected to produce increasing amounts of power, while operating at higher levels of efficiency.

Although many factors affect the performance of a given gas turbine engine, one major variable is the nature of fluid flow through the turbine section of the engine. Since the turbine section is the portion of the engine chiefly responsible for extracting energy from the working fluid that exits the engine combustion section, poor fluid flow properties is the turbine yields poor overall engine performance.

One common reducer of engine performance is a fluid flow phenomenon known as a "horseshoe vortex". Horseshoe vortices typically occur in regions where fluid flows past regions in which upstanding components intersect substantially-planar bodies. As is known in the art, they are caused by a boundary layer roll up. In the gas turbine setting, this type of flow interferes with the transfer of energy from the products of combustion to the engine blades and vanes, thereby reducing the amount of rotor spin and rate of associated electricity generation. Horseshoe vortices also interfere with the manner in which products of combustion flow across the engine fluid-guiding components, producing detrimental variations in fluid exit angles and unwanted flow departure properties, further reducing the effectiveness of downstream blades and vanes. Horseshoe vortices also impact the effectiveness of turbine cooling arrangements by increasing the effective cooling temperature of external-surface-cooling fluids, as a result of unwanted mixing between the relatively-hot working fluid and relatively-cool cooling fluids.

The horseshoe vortex phenomenon is not isolated to gas turbine engines; it occurs in a variety of other settings, including near underwater bridge pilings, along control surfaces on submarines and airplanes, and even around various portions of trailers used in the trucking industry. Accordingly, a variety of approaches have been employed to address this issue. For example, to reduce detrimental "scouring" near underwater bridge support pilings, winged deflection devices may be placed upstream of the piling to direct the water flow outwardly, away from the piling. An example of this approach is shown in U.S. Pat. No. 6,186,445. A different approach is shown in U.S. Pat. No. 6,283,713, in which airfoil members are shaped with a variety of contours chosen to modify the flow across the members. Still another approach is shown in U.S. Pat. No. 6,419,446, in which a flow directing structure is used to transfer gas flow away from the area where an airfoil abuts an associated wall. The approach shown in the '446 patent is similar to that used in the marine industry in which hulls having modified bow "noses" are employed to reduce the effects of bow waves during boat travel.

Although a several approaches have been developed to lessen the impact of horseshoe vortices, few have been designed for use in the extreme conditions found in the industrial gas turbine engine environment. Even the approaches that are suitable for use with turbine engines are not suitable in all situations. For example, airfoils with flow-modifying outer contours may be difficult to cool effectively with internal cooling schemes; lumps of material or other leading edge structures tend to be limited by heat absorption tendencies.

Accordingly, there remains a need in this art for a device that inhibits the formation of horseshoe vortices in a manner that includes cooling effective for high-heat settings and which operates with high efficiency. The device should be cooled in an active, customizable manner and should provide supplemental cooling for key locations, without requiring performance-reducing increases in cooling fluid flow. The device should also be modifiable to ensure appropriate vortex disruption and cooling performance within each turbine stage.

SUMMARY OF THE INVENTION

The instant invention is a vortex-reducing fluid guide component that includes a base portion and an upstanding body portion. An internally-cooled blending element extends between the base portion and a leading edge of the body portion. The blending element includes a deflection region that advantageously interferes with horseshoe vortex formation. In one aspect of the invention, the blending element directs cooling fluid into a supplemental cooling channel disposed between the blending element and the intersection of the body portion leading edge and the base portion. The supplemental cooling channel captures cooling fluid used to cool the blending member and synergistically provides additional cooling to the body portion leading edge/base interface. The channel is customizable to provide selected amounts of residual cooling downstream of the channel. In another aspect of the invention, the component includes a strategically-perforated impingement panel or member that distributes cooling fluid to selected portions of the blending member, thereby ensuring that key regions within the blending member are efficiently cooled in accordance with temperature distribution.

Accordingly, it is an object of the present invention to provide a fluid guide component that inhibits horseshoe vortex formation in a manner that includes highly-efficient cooling effective for operation in high-heat settings.

It is another object of the present invention to provide a fluid guide component that is cooled in an active, customizable manner.

It is also an object of the present invention to provide a fluid guide component that synergistically provides supplemental cooling for key locations, without requiring performance-reducing increases in cooling fluid flow.

It is still a further object of the present invention to provide a fluid guide component that strategically directs cooling fluid to selected portions of a blending member, ensuring that the blending member is efficiently cooled in accordance with temperature distribution.

Other objects and advantages of this invention will become apparent from the following description taken in conjunction with the accompanying drawings wherein are set forth, by way of illustration and example, certain embodiments of this invention. The drawings constitute part of this specification and include exemplary embodiments of the present invention and illustrate various objects and features thereof.

DETAILED DESCRIPTION OF THE INVENTION

Figure 1:
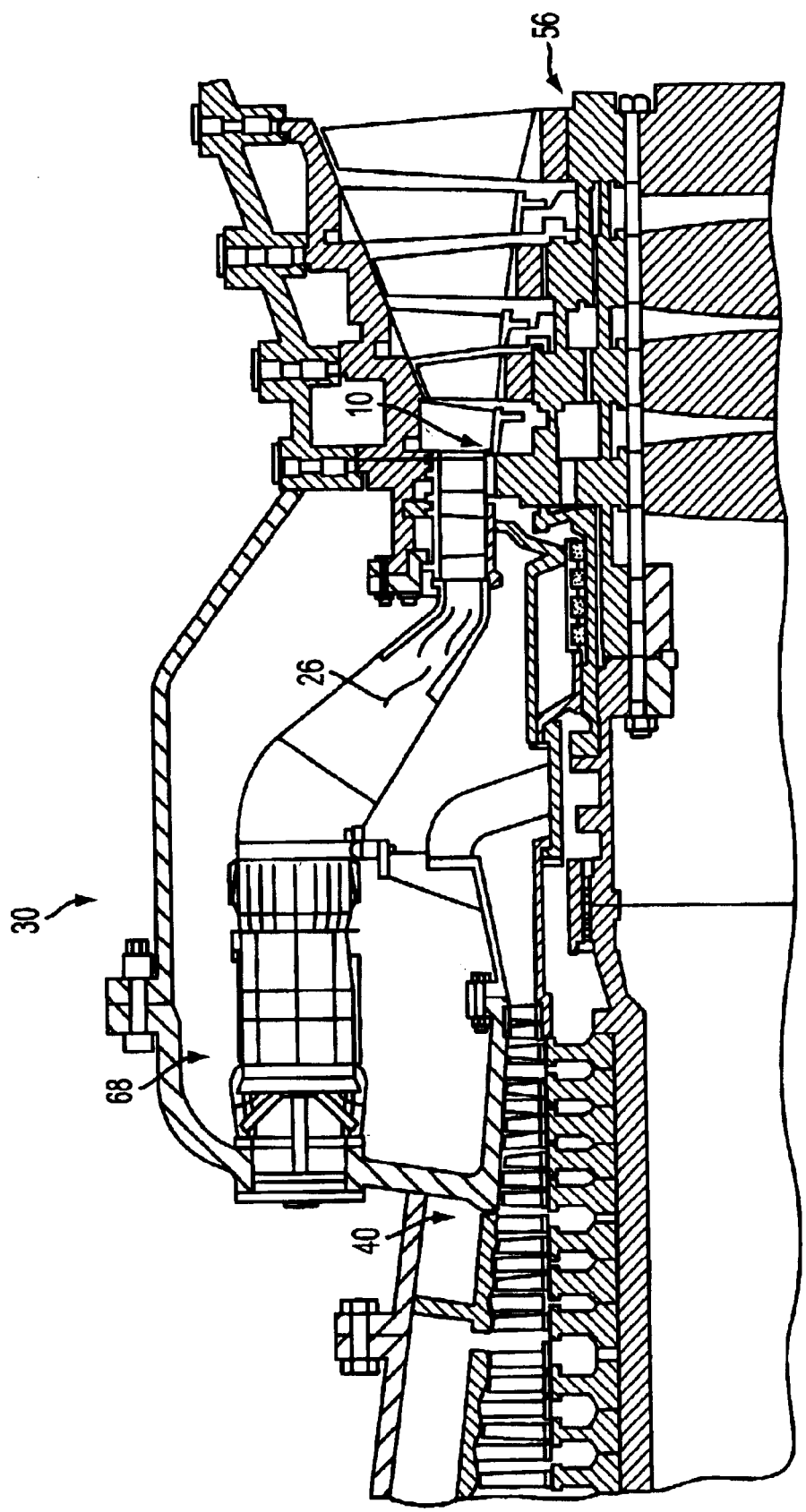
FIG. 1 is a side sectional view of a combustion engine employing the fluid guide component of the present invention.

By way of overview, and with reference to the Figures in general, the vortex-reducing fluid guide component 10 of the present invention includes a base portion 12 and a body portion 14, with the body portion extending outward from the base portion. A blending element 16 extends at least partially between the base portion 12 and a leading edge 18 of the body portion 14. The blending element 16 advantageously disrupts, as will be described more fully below, horseshoe vortex formation along the leading edge 18 of the body portion 14. The base portion 12 also includes a cooling fluid conduit 20 that allows cooling fluid 22 to pass through the base portion to contact the blending element 16. The blending element 16 is preferably hollow and has an interior passageway 50 bounded by an interior surface 66. In keeping with the objects of the invention, cooling fluid 22 passes through the cooling fluid conduit 20, flows into the blending element interior passageway 50, and travels out through a blending element exit port 24. During operation, cooling fluid 22 passing through the interior passageway 50 lowers the temperature of the blending element 16 and helps protect the blending element against thermal damage from the high-temperature products of combustion 26 which flow from an upstream combustion section 68 and across the component 10. In one embodiment, the blending element 16 is spaced away from the body portion leading edge 18 to form a supplemental cooling channel 52 along the intersection 29 of the leading edge 18 and the base portion 12. With this arrangement, the present invention 10 provides a fluid guiding component having features that reduce horseshoe vortex formation tendencies and which are especially heat tolerant. The present invention 10 also provides enhanced cooling of the body portion/base portion interface 28, especially along the leading edge/base portion 29 of the interface, without requiring performance-impacting increases in cooling fluid flow. The vortex-reducing fluid guide component 10 of the present invention will now be described in detail.

With particular reference to FIG. 1, the fluid guide component 10 of the present invention is shown in use within an industrial gas turbine engine 30. With additional reference to FIGS. 2 and 3, the fluid guide component 10 includes a body portion 14 that extends radially outward from an associated base portion 12. The base portion 12 and body portion 14 may be integral or formed separately. With either arrangement, the body portion 14 and base portion 12 intersect along a body portion/base interface 28. The body portion/base interface 28 is an area of high stress concentration. As such, this region is characterized by a fillet-type connection which helps, among other things, to transfer loads between the body portion 14 and base portion 12, while inhibiting the formation of cracks.

Figure 2:
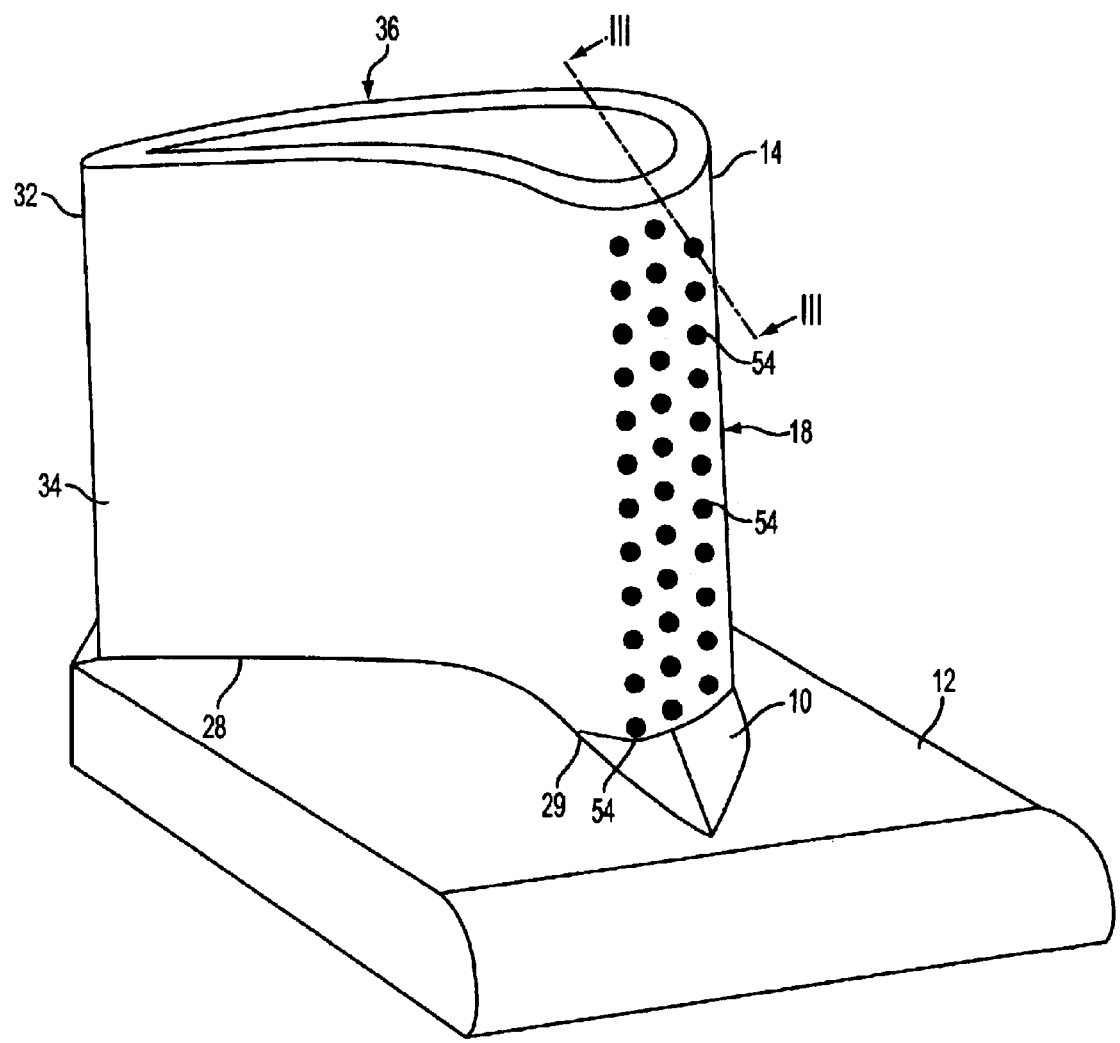
FIG. 2 is an isometric view of the fluid guide of the present invention.
Figure 3:
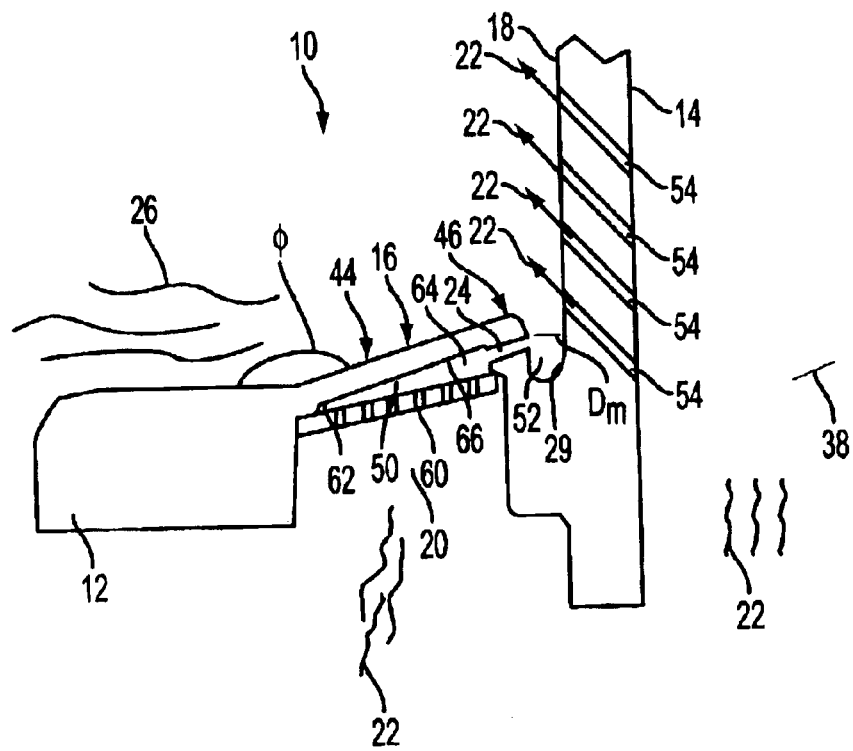
FIG. 3 is a side sectional view of the fluid guide shown in FIG. 2, taken along cutting line III–III'.

In the embodiment shown in FIGS. 2 and 3, the body portion 14 is an airfoil-shaped stator vane. It is noted, however, that the body portion could be part of a rotating blade (not shown), as well. The body portion 14 includes a leading edge 18 and an opposite trailing edge 32; the body portion is further characterized by a concave pressure side 34 and a suction side 36, which Is convex. The body portion 14 is internally cooled, and has an internal cooling chamber 38, with cooling fluid exits 54 that pass through the body portion at key locations, including the leading edge 18, trailing edge 32, and sides 34,36. The internal cooling chamber 38 is in fluid connection with a source of cooling fluid 22, such as discharge air supplied by an upstream compressor section 40, shown in FIG. 1. It is noted that other suitable, non-airfoil shapes may also be used, and that internal cooling of the body member 14 is not required.

With continued reference to FIG. 1, and with additional reference to FIGS. 2 and 3, the base portion 12 of the present invention is a mounting shroud which secures the body portion 14 within the turbine section 44 of an associated engine 30. Depending on the nature of the body portion 14, any number of other mounting platforms may be used, including hub portions, casing sections, diffuser struts portions, and swirler vanes in burners. A blending element 16 extends from the base portion 12, toward the body portion leading edge 18. The blending element 16 may be formed separate from the base and body portions 12, 14, or may be formed integral with either, or both of them. In the present embodiment, the blending element 14 is formed integral with the base portion 12.

In keeping with the objects of the present invention, a cooling fluid conduit 20 disposed within the base portion 12 allows cooling fluid 22 to pass through the base portion and into the blending member interior passageway 50, thereby reducing the temperature of the blending element 16. As noted above, the cooling fluid 22 may be air discharged from a compressor section 40. However, other sources of cooling fluid 22, such as a pump (not shown), may be used if desired. It is also noted that cooling fluid may pass directly into the cooling channel 52 through auxiliary base portion conduits 20' which extend through the base portion 12 but not the cooling chamber 38. The auxiliary base portion conduits 20' may be oriented normal to the base portion 12 or may pitched to impart desired flow properties to the fluid passing therethrough.

The blending element 16 resembles a contoured or ramped structure. The blending element 16 is characterized by a deflecting portion 44 that interacts with the working fluid flowing toward the leading edge/base portion interface 29, providing localized flow acceleration and preventing nearwall fluid flow from travelling upstream and rolling up to form a horseshoe vortex. The blending element 16 can be cast or can be formed from several pieces.

In one embodiment, the deflecting portion 44 is substantially linear, and forms an angle $\phi$ with respect to the base portion. Angle $\phi$ is preferably about 40 degrees, but may range from about 15 degrees to about 60 degrees. In the present embodiment, the blending element 16 is a single piece, but as noted above, may be formed from more than one piece if desired.

It is noted that the deflection region 44 need not be linear and can have contours chosen to further enhance the vortex-disruption properties of the blending element 16 of the present invention. For example, the deflection region 44 may include curved regions in combination with linear regions, and may include curved regions only. It is also noted that the blending element 16 may be characterized by fillets having "sharp" or pointed regions aligned with stagnation flow. The blending element 16 may also be characterized by more-rounded fillets, with vortex size being proportional to fillet radius.

With this arrangement, the present invention advantageously reduces the tendency for formation of horseshoe vortices typically associated with fluid flow at intersections of flat surfaces and upstanding members, such as the leading edge/base interface 29. Reducing the magnitude of this type of flow phenomenon results in less disturbed flow along the component 10 and increases the amount of energy which is extracted from the products of combustion 48. Reducing the magnitude of horseshoe vortices also increases the efficiency with which the component is cooled, by reducing unwanted mixing between the products of combustion 48 and cooling fluid flowing over the component 10.

A strategically-perforated impingement plate 60 may be included within the blending element interior passageway 50 to guide cooling fluid within the passageway. In this manner, various portions of the blending element 16 may be cooled in accordance with temperature distribution, ensuring that especially-hot regions (such as upstream areas 62) are cooled effectively, while reducing the amount of cooling fluid directed to less-hot regions (such as downstream areas 64). With this arrangement, the blending element 16 is cooled effectively and efficiently, without wastefully diverting cooling fluid to regions that have minimal cooling requirements.

As seen with continued reference to FIG. 3, the blending element 16 also includes a bracing region 46. The bracing region 46 includes at least one cooling fluid exit or port 24 that allows cooling fluid 22 to pass out of the region 50 bounded by the blending element 16. In one embodiment, as noted above, the bracing region 46 is spaced apart from the leading edge 18 of the body portion 14, thereby forming a supplemental cooling channel 52 into which cooling fluid 22 exiting the cooling fluid port 24 will flow. The bracing region 46 has a substantially-triangular cross section, but may be modified to impart a variety of flow characteristics. For example, the cooling channel 52 may include tapers or curves that will modify the flow dynamics of the channel: narrowing the channel 52 in the direction of downstream cooling fluid flow will increase the velocity of cooling fluid 22 within the channel, while broadening the channel in the same direction will decrease the velocity of the cooling fluid in the channel. The number of exit ports 24 and the mean distance $D_m$ between the bracing region and the leading edge may each be selected in accordance with these considerations, as well. An appropriate range would be about 5% to 50% of the leading edge diameter. It is noted that the channel 52 may be tapered with regard to a radial (i.e., away from and toward the base portion 12) axis, with regard to a longitudinal (i.e., generally along the base portion) axis, and with regard to spacing relative to the contours of the leading edge portion 18.

In keeping with the objects of the present invention, this arrangement allows strategic selection of these attributes to provide a great deal of flexibility regarding the amount of supplemental cooling which the channel 52 provides, as well as the amount of cooling capacity that remains in the cooling fluid 22 for residual cooling of the body portion sides 34,36, as the fluid leaves the channel.

During operation, products of combustion 48 flow across the vortex-reducing, fluid guide component 10 of the present invention, imparting spin to the rotor shaft 56 upon which the component is mounted. As the shaft spins, an associated generator (not shown) connected to the shaft produces electricity. As the shaft continues to spin, cooling fluid 22 travels toward the component of the present invention 10. With continued operation, a first portion of the cooling fluid 22 flows into the body portion cooling chamber 38, while a second portion of the cooling fluid flows through the base portion cooling conduit 20 and into the blending element interior passageway 50. The first portion of cooling fluid 22 enters the body portion cooling chamber 38, reduces the temperature of the body portion, and passes through the body portion exits 54. As the first portion of cooling fluid 22 passes through the exits 54, it travels along the body portion sides 34,36, and further reduces the temperature of the body portion 14. In parallel, the second portion of the cooling fluid 22 enters into the blending member interior passageway 50, and reduces the temperature of the blending member 16. As more cooling fluid 22 continues to flow, the second portion of cooling fluid leaves the blending member interior passageway 50, travels through the blending member exit port 24, and enters the supplemental cooling chamber 52. As the second portion of cooling fluid 22 enters the supplemental cooling chamber 52, the leading edge/base portion interface 29 is cooled, with residual cooling occurring along the remainder of the body/base interface 28 as the second portion of cooling fluid leaves the channel and flows toward the body portion trailing edge 32. It is noted that the present invention is not limited to use with industrial gas turbine engines, as it is useful in all manner of turbine engines, including aero-derivative engines, as well.

The flow of products of combustion, which produces electricity, and the flow of cooling fluid, which beneficially lowers the component temperature, are both enhanced by the blending element 16 of the present invention. By reducing the magnitude of horseshoe vortices at the leading edge/body portion interface 29, the blending element 16 of the present invention improves the quality of flow across the component of the present invention 10. In particular, the blending element 16 reduces the energy of the flow which is used to drive the horseshoe vortex along the sides 34,36 of the body member, allowing energy to be transferred to the body portion with reduced losses and increased effectiveness.

Figure 4:
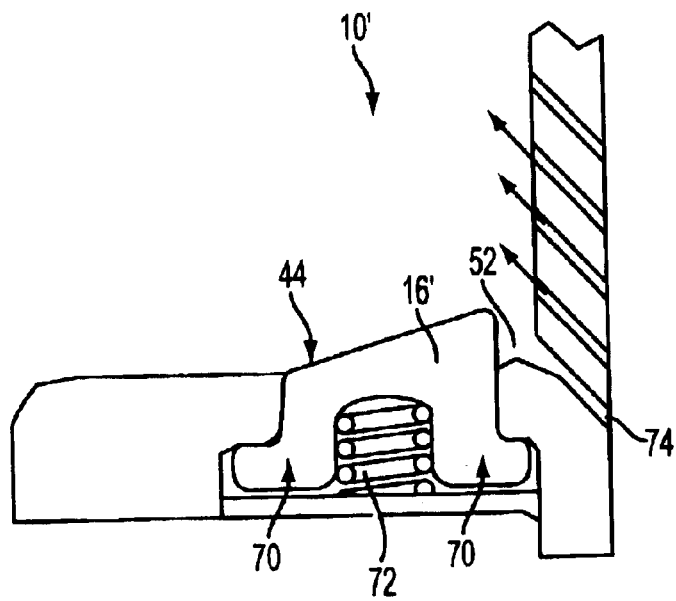
FIG. 4 is a side sectional view of an alternate embodiment of the fluid guide of the present invention.

Furthermore, and in keeping with the objects of the invention, the present fluid guide component 10 incorporates features that to not only actively cool the blending element 16, but which also provide supplemental cooling for the highly-stressed body leading edge/base interface region 29 without requiring additional flows of cooling fluid 22. By providing a supplemental cooling channel 52 which cooperates with the blending element 16 to recover cooling fluid 22 for cooling the area adjacent the leading edge/base portion 29 interface, the cooling arrangement of the present invention 10 provides a combination of features that synergistically provide increased performance and enhanced cooling efficiency. In this It is noted that, in an alternate embodiment, the blending element 16' may be a discrete component formed from a ceramic or other heat-resistant material, such that internal cooling is not needed. In such an embodiment, as shown in FIG. 4, the component 10' still disrupts horseshoe vortex formation and provides a supplemental cooling channel 52. Cooling fluid entering the supplemental cooling channel 52 through a dedicated cooling channel fluid port 74 disposed within the leading edge 28 of the body member 16, adjacent the body portion leading edge/base portion interface 29. With this arrangement, cooling fluid 22 still enters the supplemental cooling channel 52, and the performance of the channel is modifiable in accordance with the residence times and residual cooling considerations discussed above. It is noted that in this embodiment, the blending element 16' is a single-piece construction, but may be formed from more than one piece if desired.

With continued reference to FIG. 4, the blending element 16' is a contoured plug held in place with respect to the base and body portions 12,14 via a tongue-and-groove type arrangement. A biasing member 72, such as a spring, may be included to dampen the blending element 16' fixing arrangement, advantageously allowing the blending element to tolerate vibration and thermal expansion within the component 10 during operation.

The present invention 10,10' provides a combination of features that simultaneously provide reduced vortex-forming tendencies and a unique, extremely-efficient cooling arrangement, resulting in a fluid guide component 10 that achieves improved aerodynamic and power extraction properties, without requiring performance-degrading cooling fluid flow increases.

It is to be understood that while certain forms of the invention have been illustrated and described, it is not to be limited to the specific forms or arrangement of parts herein described and shown. It will be apparent to those skilled in the art that various, including modifications, rearrangements and substitutions, may be made without departing from the scope of this invention and the invention is not to be considered limited to what is shown in the drawings and described in the specification. The scope if the invention is defined by the claims appended hereto.

What is claimed is:

1. A vortex-reducing fluid guide component comprising:
 a base portion;
 a body portion extending from said base portion and being characterized by a leading edge, a first side, and a second side;
 a blending element disposed between said base portion and said leading edge, said blending element being characterized by a deflection region adapted to accelerate fluid flow, said blending element including an interior passageway in fluid communication with a source of cooling fluid; and
 a cooling channel disposed between said blending element and said leading edge, said cooling channel being adapted for fluid communication with a source of cooling fluid and being bounded by said leading edge, said base portion and said blending element,
 whereby said blending element is adapted for cooling by said cooling fluid and is effective to disrupt horseshoe vortex formation adjacent an interface of said base portion and said leading edge, and whereby said cooling channel is customizable to selectively cool said interface of said leading edge and said base portion and an interface of said base portion sides and said body portion.

2. The vortex-reducing fluid guide component of claim 1, wherein said cooling channel is adapted for cooling by cooling fluid passing through a cooling fluid exit disposed in said body portion.

3. The vortex-reducing fluid guide component of claim 2, wherein said cooling fluid exit is located in said leading edge.

4. The vortex-reducing fluid guide component of claim 2, wherein said blending element is further characterized by a bracing region spaced from said leading edge.

5. The vortex-reducing fluid guide component of claim 1, wherein said base portion includes a cooling fluid conduit adapted for passing said cooling fluid into said blending element interior passageway, whereby said blending element is adapted for cooling by cooling fluid flowing through said base member.

6. The vortex-reducing fluid guide component of claim 1, wherein said blending element interior passageway is in fluid communication with said cooling channel, whereby said cooling passageway is adapted for cooling by cooling fluid flowing through said interior passageway.

7. The vortex-reducing fluid guide component of claim 1, further including a flow distribution member disposed within said interior passageway, said flow distribution member being adapted to distribute cooling fluid across said blending element.

8. The vortex-reducing fluid guide component of claim 7, wherein said guide cooling fluid is strategically perforated to distribute cooling fluid to a selected area of said blending element.

9. The vortex-reducing fluid guide component of claim 8, wherein said selected area is an upstream area of said interior passageway.

10. The vortex-reducing fluid guide component of claim 8, wherein said selected area is a downstream area of said interior passageway.

11. The vortex-reducing fluid guide component of claim 1, wherein said blending element is further characterized by a bracing region spaced from said leading edge.

12. The vortex-reducing fluid guide component of claim 11, wherein said cooling channel is narrowed in the direction of cooling fluid flow, whereby said cooling channel is effective to promote extended contact of said cooling fluid with said leading edge.

13. The vortex-reducing fluid guide component of claim 11, wherein said cooling channel is widened in the direction of cooling fluid flow, whereby said cooling channel is effective to deter extended contact of said cooling fluid with said leading edge.

14. The vortex-reducing fluid guide component of claim 13, further including a flow distribution member disposed within said interior passageway, said flow distribution member being adapted to distribute cooling fluid across said blending element.

15. The vortex-reducing fluid guide component of claim 14, wherein said guide cooling fluid is strategically perforated to distribute cooling fluid to a selected area of said blending element.

16. The vortex-reducing fluid guide component of claim 15, wherein said selected area is an upstream area of said interior passageway.

17. The vortex-reducing fluid guide component of claim 15, wherein said selected area is a downstream area of said interior passageway.

18. A vortex-reducing fluid guide component comprising:

a base portion;

a body portion extending from said base portion and being characterized by a leading edge, a first side, and a second side;

a blending element disposed between said base portion and said leading edge, said blending element being characterized by a deflection region adapted to accelerate fluid flow, said blending element including a bracing region spaced from said leading edge; and a cooling channel adapted for cooling by cooling fluid passing through a cooling fluid exit disposed in said body portion, said cooling channel being disposed between said blending element and said leading edge, said cooling channel being adapted for fluid communication with a source of cooling fluid and being bounded by said leading edge, said base portion and said blending element, said cooling channel being narrowed in the direction of cooling fluid flow, whereby said cooling channel is effective to promote extended contact of said cooling fluid with said leading edge;

whereby said blending element is effective to disrupt horseshoe vortex formation adjacent an interface of said base portion and said leading edge, and whereby said cooling channel is customizable to selectively cool said interface of said leading edge and said base portion and an interface of said base portion sides and said body portion.

19. A vortex-reducing fluid guide component comprising:

a base portion;

a body portion extending from said base portion and being characterized by a leading edge, a first side, and a second side;

a blending element disposed between said base portion and said leading edge, said blending element being characterized by a deflection region adapted to accelerate fluid flow, said blending element including a bracing region spaced from said leading edge; and a cooling channel adapted for cooling by cooling fluid passing through a cooling fluid exit disposed in said body portion, said cooling channel being disposed between said blending element and said leading edge, said cooling channel being adapted for fluid communication with a source of cooling fluid and being bounded be said leading edge, said base portion and said blending element, said cooling channel being widened in the direction of cooling fluid flow, whereby said cooling channel is effective to deter extended contact of said cooling fluid with said leading edge;

whereby said blending element is effective to disrupt horseshoe vortex formation adjacent an interface of said base portion and said leading edge, and whereby said cooling channel is customizable to selectively cool said interface of said leading edge and said base portion and an interface of said base portion sides and said body portion.

* * * * *